Patented Mar. 1, 1932

1,847,566

UNITED STATES PATENT OFFICE

HUGO E. LASCHINGER, OF BLOOMFIELD, NEW JERSEY

PROCESS OF PRODUCING PARA-CHLOR-META-CRESOL

No Drawing. Application filed November 4, 1930, Serial No. 493,460, and in Germany January 28, 1927.

My invention relates to an improvement in the process of producing para-chlor-meta-cresol from meta-cresol or preferably from crude cresol which contains a substantial proportion of meta-cresol in addition to para-cresol, ortho-cresol and other substances.

Meta-cresol may be converted into para-chlor-meta-cresol by treatment with chlorine alone but the yield is a poor one. Meta-cresol may also be converted into para-chlor-meta-cresol and with a very satisfactory yield by chlorination with sulfuryl chloride.

I have found that I can obtain the same yield that can be obtained by the use of sulfuryl chloride by passing a mixture of chlorine gas and sulfur dioxide over activated carbon under such conditions that a substantial proportion of the chlorine remains uncombined, the total chlorine entering into the mixture being equivalent in amount to that used in the sulfuryl chloride process, and then passing the resulting gas mixture into meta-cresol.

By my preferred method I assure the presence of such uncombined chlorine by using sulfur dioxide very much less in amount than that which would be necessary to convert all of the chlorine into sulfuryl chloride. I may use as low as only one-third, or even less, of the amount of sulfur dioxide which would be necessary for this purpose.

A second method is that of mixing chlorine and sulfur dioxide in molecular proportions, that is, in such proportions as would be sufficient to convert all of the chlorine into sulfuryl chloride, passing the mixture over the activated carbon at a temperature, for instance, room temperature, which is so unfavorable to the reaction between chlorine and sulfur dioxide that only a poor yield of sulfuryl chloride could be obtained.

A third method, which is a corollary of the second, is that of passing chlorine and sulfur dioxide in molecular proportions over activated carbon at a temperature (for instance 0°–5° C.) at which under proper conditions a high yield of sulfuryl chloride can be obtained, by passing the mixture over the activated carbon at such a rate of speed that the time is not sufficient to permit a complete reaction between the chlorine and the sulfur dioxide, thus leaving a substantial proportion of the chlorine free.

By my process, whatever may be the particular method employed, I obtain, other things being equal, substantially the same yield of para-chlor-meta-cresol, such yield being approximately the same as that which can be obtained by the use of sulfuryl chloride, although I always have present in the mixture which is passed into the meta-cresol a substantial proportion of uncombined chlorine. The lowest proportion of sulfur dioxide which may be used depends somewhat upon the various conditions, for instance, temperature, under which the reaction is conducted and can readily be ascertained by simple experiment.

I may use in my process substantially any proportion of sulfur dixoide in excess of such minimum up to and even in excess of the amount which would be necessary to convert all of the chlorine into sulfuryl chloride but it seems clear that no advantage is gained by using more sulfur dioxide than necessary. I should therefore in commercial practice use only my preferred method.

My second and third methods hereinabove referred to are valuable mainly as illustrating the difference between my process and that of using only sulfuryl chloride, that is, the distinction between using molecular proportions of chlorine and sulfur dioxide to form sulfuryl chloride and then treating meta-cresol with such sulfuryl chloride, and using the same proportions of starting materials under conditions under which a substantial proportion of uncombined chlorine is present in the gas mixture which is passed into the meta-cresol.

Some sulfuryl chloride is formed when the chlorine and sulfur dioxide are passed over the activated carbon and this is carried along by the gases in a finely vaporized or in vapor form, but there is always present in the gases a substantial proportion of uncombined chlorine.

When treating meta-cresol alone by my process, it is substantially necessary to have the meta-cresol diluted by a suitable diluent, such as carbon tetrachloride, as the resulting para-chlor-meta-cresol solidifies very rapidly and would therefore interfere with the operation of the process if a diluent were not present. In ordinary commercial practice I prefer to treat raw cresol directly instead of first extracting the meta-cresol therefrom.

It is advisable to add to the gases a suitable diluent such as air, in order to prevent violence of reaction. Such diluent may be added before or after the gases have passed over the activated carbon. I prefer to add it after the gases have passed over the activated carbon so as not to interfere with the full contact between gases and carbon. In order to obtain the highest possible yield when operating my preferred method, I must add a diluent to the gases, as without the use of such diluent (as shown by Example 2), the yield is a much lower one.

I prefer to have the meta-cresol at a temperature in the neighborhood of 0° C. in order to improve the yield.

The advantage of my process is that I obtain a better yield than when chlorine alone or in admixture with air is used and because I do not employ the comparatively expensive isolated sulfuryl chloride. It will be noted also that instead of employing in my preferred method as much sulfur dioxide as would be necessary to convert all the chlorine into sulfuryl chloride, I employ a very much smaller amount of sulfur dioxide. This substance does not enter directly into reaction with the meta-cresol but apparently serves by its presence to assure the formation of a maximum quantity of para-chlor-meta-cresol and reduce the formation of isomers and/or other derivatives of this substance, and then passes out as a by-product or waste product not readily reclaimable except with the use of expensive apparatus and methods.

My process is, moreover, one which can be very easily operated and necessitates very little, if any, supervision.

Example 1

To 45.4 kg. of meta-cresol 96%, add 49.9 kg. of carbon tetrachloride as a diluent, pass a mixture of 29 kg. of chlorine gas and 10.9 kg. of sulfur dioxide over activated carbon under such conditions that insofar as possible every particle of the mixture comes into contact with the carbon, then add an amount of air equal in volume to that of the mixture of such gases and then pass the resulting mixture through the meta-cresol while maintaining the latter at a temperature of approximately 0° C.

The yield of para-chlor-meta-cresol is about 36.3 kg. or 63.9%.

Example 2

Employ the materials as in Example 1 except that 59 kg. of carbon tetrachloride is used, 9.5 kg. of sulfur dioxide and no air.

The yield of para-chlor-meta-cresol is 25 kg. or 44%.

Example 3

To 45.4 kg. of meta-cresol 96% add 49.9 kg. of carbon tetrachloride as a diluent, pass a mixture of 29 kg. of chlorine gas and 25 kg. of sulfur dioxide over activated carbon under such conditions that every particle of the mixture comes into contact with the carbon without, however, lowering the temperature of the air surrounding the carbon-containing tube, pass the resulting mixture of gases through the meta-cresol while maintaining the latter at a temperature of approximately 0° C.

The yield of para-chlor-meta-cresol is approximately the same as that obtained in Example 1.

I claim:

1. The process of producing para-chlor-meta-cresol which comprises treating meta-cresol with a mixture containing sulfuryl chloride and a substantial amount of uncombined chlorine, the total amount of chlorine being substantially no greater than the amount required to convert the meta-cresol into para-chlor-meta-cresol.

2. The process of producing para-chlor-meta-cresol which consists in treating meta-cresol with a mixture containing sulfuryl chloride and uncombined chlorine.

3. The process of producing para-chlor-meta-cresol which comprises treating meta-cresol with a mixture containing sulfuryl chloride and a substantial amount of uncombined chlorine, the amount of chlorine in said sulfuryl chloride being substantially less than the amount required to convert the meta-cresol into para-chlor-meta-cresol.

4. The process of producing para-chlor-meta-cresol which consists in treating meta-cresol with a mixture of sulfuryl chloride, sulphur dioxide and a substantial amount of uncombined chlorine, the amount of uncombined sulphur dioxide present in said mixture being less than the amount required to convert all the uncombined chlorine present in said mixture into sulfuryl chloride.

5. The process of producing para-chlor-meta-cresol which consists in treating meta-cresol with a mixture of sulfuryl chloride, sulphur dioxide and a substantial amount of uncombined chlorine, the amount of uncombined sulphur dioxide present in said mixture being less than the amount required to convert all he uncombined chlorine present in said mixture into sulfuryl chloride, the total amount of chlorine being substantially no greater than the amount required to convert the meta-cresol into para-chlor-meta-cresol.

6. The process of producing para-chlor-meta-cresol which consists in treating meta-cresol with a mixture prepared by passing chlorine and sulphur dioxide over activated carbon under such conditions that a substantial proportion of the chlorine is not combined into sulfuryl chloride.

7. The process of producing para-chlor-meta-cresol which consists in treating meta-cresol wth a mixture prepared by passing chlorine and sulphur dioxide over activated carbon, at such temperature that a substantial proportion of the chlorine is not combined into sulfuryl chloride.

8. The process of producing para-chlor-meta-cresol which consists in treating meta-cresol with a mixture prepared by passing chlorine and sulphur dioxide over activated carbon, the amount of sulphur dioxide being insufficient to convert a substantial proportion of the chlorine into sulfuryl chloride.

9. The process of producing para-chlor-meta-cresol which consists in treating meta-cresol with a mixture prepared by passing chlorine and sulfur dioxide over activated carbon, at such speed that a substantial proportion of the chlorine is not combined into sulfuryl chloride.

HUGO E. LASCHINGER.